United States Patent
Suzuka et al.

(10) Patent No.: US 10,236,505 B2
(45) Date of Patent: Mar. 19, 2019

(54) POSITIVE ELECTRODE ACTIVE SUBSTANCE FOR NON-AQUEOUS ELECTROLYTE SECONDARY BATTERY, POSITIVE ELECTRODE AND NON-AQUEOUS ELECTROLYTE SECONDARY BATTERY

(71) Applicant: JGC CATALYSTS AND CHEMICALS LTD., Kawasaki-shi, Kanagawa (JP)

(72) Inventors: Yasuhiro Suzuka, Kitakyushu (JP); Mariko Hashimoto, Kitakyushu (JP); Takahiro Yashima, Kitakyushu (JP)

(73) Assignee: JGC CATALYSTS AND CHEMICALS LTD., Kawasaki (JP)

( * ) Notice: Subject to any disclaimer, the term of this patent is extended or adjusted under 35 U.S.C. 154(b) by 0 days.

(21) Appl. No.: 15/554,198

(22) PCT Filed: Mar. 4, 2016

(86) PCT No.: PCT/JP2016/056852
§ 371 (c)(1),
(2) Date: Aug. 28, 2017

(87) PCT Pub. No.: WO2016/140352
PCT Pub. Date: Sep. 9, 2016

(65) Prior Publication Data
US 2018/0034052 A1   Feb. 1, 2018

(30) Foreign Application Priority Data
Mar. 4, 2015   (JP) ................ 2015-042894

(51) Int. Cl.
*H01M 4/505* (2010.01)
*H01M 4/525* (2010.01)
(Continued)

(52) U.S. Cl.
CPC ............ *H01M 4/505* (2013.01); *C01G 53/54* (2013.01); *H01M 4/131* (2013.01); *H01M 4/525* (2013.01);
(Continued)

(58) Field of Classification Search
CPC ...... H01M 4/505; H01M 4/525; H01M 4/131; H01M 10/0525; H01M 2004/028
See application file for complete search history.

(56) References Cited

U.S. PATENT DOCUMENTS

| 5,783,332 A | 7/1998 | Amine et al. |
| 2008/0157027 A1* | 7/2008 | Manthiram ............ H01M 4/131 252/506 |
| 2014/0377659 A1 | 12/2014 | Oljaca et al. |

FOREIGN PATENT DOCUMENTS

| JP | H08-298115 | 11/1996 |
| JP | H09-147867 A | 6/1997 |

(Continued)

OTHER PUBLICATIONS

May 24, 2016 International Search Report issued in International Patent Application No. PCT/JP2016/056852.
(Continued)

*Primary Examiner* — Osei K Amponsah
(74) *Attorney, Agent, or Firm* — Oliff PLC

(57) ABSTRACT

A cathode active material for a non-aqueous electrolyte secondary battery satisfies conditions (1) to (5): (1) the cathode active material contains Li, Mn, and Ni and has a spinel structure; (2) a molar ratio of Ni to Mn is in a range from 0.10 to 0.43; (3) a molar ratio of Li to Mn is in a range from 0.70 to 1.80; (4) the cathode active material has a peak in a range of $2\theta=19.7$ to $22.5°$ in an X-ray diffraction pattern; and (5) the cathode active material has at least one peak in a voltage range of voltage $V_1$ and at least two peaks in a (Continued)

voltage range of voltage $V_2$ in an initial dQ/dV curve of a discharge measured when a half cell is prepared using the cathode active material, $V_1$=2.72 to 2.90 [V]

$V_2$=4.50 to 4.80 [V].

4 Claims, 3 Drawing Sheets

(51) Int. Cl.
  *H01M 4/131* (2010.01)
  *H01M 10/0525* (2010.01)
  *C01G 53/00* (2006.01)
  *H01M 4/02* (2006.01)

(52) U.S. Cl.
  CPC ..... *H01M 10/0525* (2013.01); *C01P 2002/32* (2013.01); *C01P 2002/72* (2013.01); *C01P 2006/12* (2013.01); *H01M 2004/028* (2013.01)

(56) References Cited

FOREIGN PATENT DOCUMENTS

| JP | 2009-176583 A | 8/2009 |
| JP | 2011-522383 A | 7/2011 |
| JP | 2013-503450 A | 1/2013 |
| JP | 2015-220220 A | 12/2015 |
| WO | 2014/124366 A1 | 8/2014 |
| WO | 2015/174225 A1 | 11/2015 |

OTHER PUBLICATIONS

Amine et al.; "A New Three-Volt Spinel Li1+xMn1.5Ni.05O4 for Secondary Lithium Batteries;" J. Electrochem. Soc.; May 1996; vol. 143, No. 5.

Oct. 30, 2018 Search Report issued in European Patent Application No. 16759044.7.

\* cited by examiner

POSITIVE ELECTRODE ACTIVE SUBSTANCE FOR NON-AQUEOUS ELECTROLYTE SECONDARY BATTERY, POSITIVE ELECTRODE AND NON-AQUEOUS ELECTROLYTE SECONDARY BATTERY

TECHNICAL FIELD

The present invention relates to a cathode active material for a non-aqueous electrolyte secondary battery, a cathode and a non-aqueous electrolyte secondary battery.

BACKGROUND ART

Secondary batteries refer to batteries capable of repeated charging and discharging. Main components of the secondary batteries include a cathode, an anode and electrolytic solution. The secondary batteries can be roughly classified according to the electrolytic solution. Among the secondary batteries, a secondary battery using an organic solvent for the electrolytic solution is referred to as a non-aqueous electrolyte secondary battery. A typical non-aqueous electrolyte secondary battery is a lithium-ion secondary battery.

The cathode of the non-aqueous electrolyte secondary battery usually contains an active material, an electrical conductive material, a binder, a current collector and the like.

The active material refers to an electrochemically active substance. Examples of the cathode active material of the non-aqueous electrolyte secondary battery include $LiCoO_2$, $LiNiO_2$, and $LiMn_2O_4$.

The cathode active material of the non-aqueous electrolyte secondary battery is categorized according to the structure of the active material. For instance, $LiCoO_2$, $LiNiO_2$ and the like are categorized into an active material of a layered structure. $LiMn_2O_4$ is categorized into an active material of a spinel structure.

$LiMn_2O_4$, which has the above spinel structure, is less expensive and safer than $LiCoO_2$, $LiNiO_2$ and the like having the layered structure. However, the energy density per a unit mass of the $LiMn_2O_4$ having the spinel structure is smaller than that of $LiCoO_2$, $LiNiO_2$ and the like having the layered structure. In order to increase the energy density per a unit mass, it is necessary to raise an operating voltage of a battery or to increase a discharge capacity.

In Patent Literature 1, a part of Mn in $LiMn_2O_4$ is substituted by Ni to raise the operating voltage of a battery. In one of the Examples, it is disclosed that an operating potential of a battery can be raised to 4.5 V or more by substituting a part of Mn in $LiMn_2O_4$ by Ni to produce $LiMn_{1.5}Ni_{0.5}O_4$.

In Patent Literature 2, the discharge capacity of a battery is increased by providing an excessive Li in $LiMn_{1.5}Ni_{0.5}O_4$. In one of Examples, it is disclosed that $LiMn_{1.5}Ni_{0.5}O_4$ and LiI are reacted at 80 degrees C. for 13 hours to synthesize $Li_2Mn_{1.5}Ni_{0.5}O_4$, which shows a discharge capacity in a range of 160 to 180 mAh/g.

In Patent Literature 3, the discharge capacity of a battery is increased by reacting $LiMn_{1.5}Ni_{0.5}O_4$ with LiI and subsequently annealing the reactant in a nitrogen atmosphere. In one of Examples, it is disclosed that $Li_2Mn_{1.5}Ni_{0.5}O_4$, which is synthesized by reacting $LiMn_{1.5}Ni_{0.5}O_4$ and LiI and subsequently is annealed at 300 degrees C. for five hours in a nitrogen atmosphere, shows a discharge capacity of approximately 240 mAh/g.

These related arts are, though showing high energy density, insufficient in terms of deterioration of the discharge capacity after repeated charging and discharging (cycle characteristics).

Patent Literature 4 discloses that the cycle characteristics are improved by electrochemically inserting Li into $LiMn_{1.5}Ni_{0.5}O_4$ to provide an excessive Li. However, though the method disclosed in Patent Literature 4 improves the cycle characteristics, sufficient discharge capacity cannot be obtained.

CITATION LIST

Patent Literature(S)

Patent Literature 1 JP 9-147867 A
Patent Literature 2 JP 8-298115 A
Patent Literature 3 WO 2014/124336 A
Patent Literature 4 JP 2009-176583 A

SUMMARY OF THE INVENTION

Problem(s) to be Solved by the Invention

An object of the invention is to provide a cathode active material for a non-aqueous electrolyte secondary battery having excellent cycle characteristics, a cathode, and a non-aqueous electrolyte secondary battery having excellent cycle characteristics.

Means for Solving the Problem(s)

In order to solve the above problem, an object of the invention is to provide a cathode active material for a non-aqueous electrolyte secondary battery, a cathode, and a non-aqueous electrolyte secondary battery as described below.

A cathode active material for a non-aqueous electrolyte secondary battery according to an aspect of the invention satisfies conditions (1) to (5) below.
(1) The cathode active material comprises Li, Mn, and Ni and has a spinel structure.
(2) A molar ratio (Ni/Mn) of Ni to Mn is in a range from 0.10 to 0.43.
(3) A molar ratio (Li/Mn) of Li to Mn is in a range from 0.70 to 1.80.
(4) The cathode active material has a peak in a range of $2\theta=19.7$ to 22.5 degrees in an X-ray diffraction pattern.
(5) The cathode active material has at least one peak in a first voltage range of voltage $V_1$ and at least two peaks in a second voltage range of voltage $V_2$ in an initial dQ/dV curve of a discharge measured when a half cell is prepared using the cathode active material according to a process below.
  $V_1$=2.72 to 2.90 [V]
  $V_2$=4.50 to 4.80 [V]
The process includes: weighing the cathode active material, an electrical conductive material in a form of acetylene black and KS6 and a binder in a form of polyvinylidene fluoride to be a mass ratio of 80:5:5:10; mixing the cathode active material, the electrical conductive material and the binder in N-methyl-2-pyrrolidone (NMP) to prepare a cathode coating liquid; applying the cathode coating liquid on a current collector in a form of an aluminum foil and, after drying the cathode coating liquid, rolling the current collector so that the current collector has a film thickness in a range from 35 to 45 μm; punching the current collector in a diameter of 14 mm, and vacuum-drying the current collector to obtain a cathode; layering the cathode and an anode in a form of a metal lithium foil having a thickness of 0.2 mm in a coin-type cell case through a separator in a form of a glass filter; pouring an electrolytic solution in which $LiPF_6$ was dissolved at 1 mol/L concentration in a mixture solvent of ethylene carbonate and ethylmethyl carbonate (volume ratio 1:2) in the coin-type cell case to produce the half cell; charging the half cell with an electric current corresponding to 0.05 C to 4.8 V and discharging the half cell with an electric current corresponding to 0.2 C to 2.0 V; and drawing a dQ/dV curve by picking up discharge capacities Q at 0.1 V intervals from an initial discharge curve data obtained in the charging and discharging and plotting a variation dV of a voltage V and a variation dQ of a discharge capacity Q.

A cathode according to another aspect of the invention contains the cathode active material for a non-aqueous electrolyte secondary battery of the above aspect of the invention.

A non-aqueous electrolyte secondary battery according to still another aspect of the invention includes the cathode of the above aspect of the invention.

According to the above aspects of the invention, a cathode active material for a non-aqueous electrolyte secondary battery having excellent cycle characteristics, a cathode, and a non-aqueous electrolyte secondary battery having excellent cycle characteristics can be obtained.

BRIEF DESCRIPTION OF DRAWING(S)

DESCRIPTION OF EMBODIMENT(S)

Figure 1:
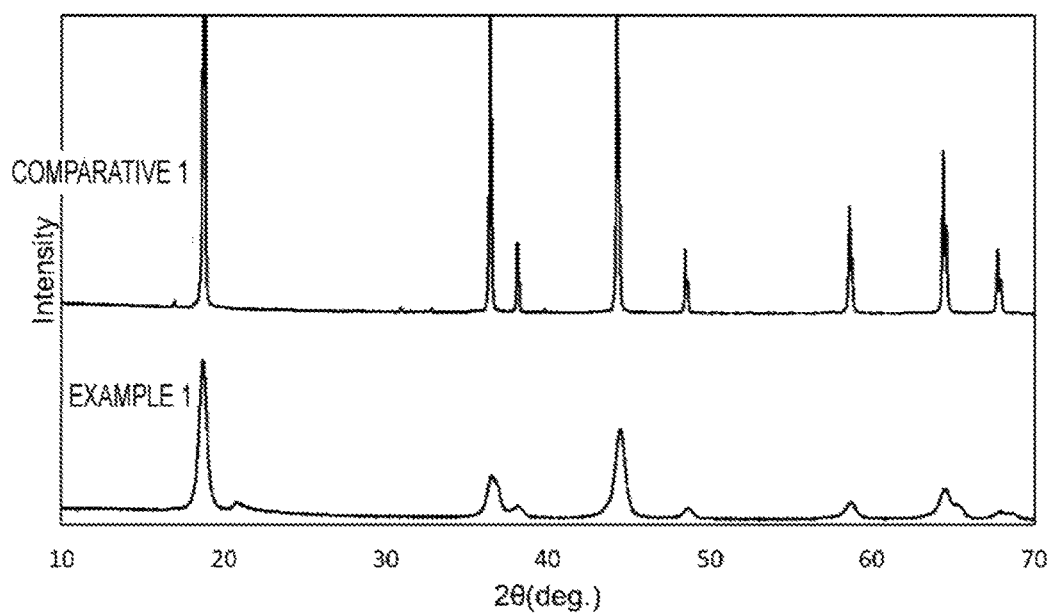
FIG. 1 is a graph showing an X-ray diffraction pattern of a cathode active material obtained in Example 1 and Comparative 1.

An exemplary embodiment of a cathode active material for a non-aqueous electrolyte secondary battery of the invention (referred to as "the present cathode active material" hereinafter) will be described below.

Composition of the Present Cathode Active Material

The present cathode active material contains constituent elements including Li, Mn, and Ni. The contents of Li, Mn and Ni in the present cathode active material are defined in terms of a molar ratio (Ni/Mn) of Ni to Mn and a molar ratio (Li/Mn) of Li to Mn, as follows.

Ni/Mn=0.10 to 0.43 [-]
Li/Mn=0.70 to 1.80 [-]

It is more preferable that the molar ratios are in the following ranges.

Ni/Mn=0.17 to 0.35 [-]
Li/Mn=0.80 to 1.50 [-]

It is further preferable that the molar ratios are in the following ranges.

Ni/Mn=0.20 to 0.35 [-]
Li/Mn=1.20 to 1.50 [-]

The above ranges for Ni/Mn and Li/Mn are preferable because an initial discharge capacity is further enhanced.

The present cathode active material may contain an element(s) M other than Li, Mn, and Ni. The element(s) M is preferably selected from the following elements.

M=Na, K, Mg, Ca, Zn, Sr, Ba, Al, Ga, In, Si, Ge, Sn, P, Sb, B, S

The content of the element M is defined in terms of a molar ratio (M/Mn) of the element M to Mn, which is preferably in the following range.

M/Mn=0.05 to 0.15 [-]

It is more preferable that the molar ratio is in the following range.

M/Mn=0.05 to 0.07 [-]

When the ratio M/Mn is not within the above range, the initial discharge capacity and the cycle characteristics may be sometimes deteriorated.

Structure of the Present Cathode Active Material

The present cathode active material has a spinel structure. The presence/absence of the spinel structure can be determined based on an X-ray diffraction pattern obtained by an Powder X-ray diffraction measurement. In the exemplary embodiment, it is determined that a cathode active material has a spinel structure when an X-ray diffraction pattern obtained by measuring the cathode active material under the later-described conditions for the Powder X-ray diffraction measurement has a peak within any one of the following ranges of 2θ.

2θ=17.0 to 20.0 [°]
2θ=35.0 to 37.5 [°]
2θ=37.5 to 39.0 [°]
2θ=41.5 to 46.0 [°]
2θ=47.7 to 50.0 [°]

The X-ray diffraction pattern of the present cathode active material has another peak in the following range of 2θ in addition to the above peaks derived from the spinel structure.

2θ=19.7 to 22.5 [°]

It is not known to which structure the above peak is attributable. However, it is supposed that the structure of the present cathode active material is a mixed-crystal structure of the spinel structure and the layered structure. It is supposed that the present cathode active material having the mixed-crystal structure allows efficient donation and acceptance of electrons between lithium atoms in different crystal structures, so that the present cathode active material exhibits excellent cycle characteristics as compared to a mixture of a compound solely having the spinel structure and a compound solely having the layered structure. It should be noted that the X-ray diffraction pattern of lithium manganate having the spinel structure obtained by Li insertion (electrochemically or with a use of lithium iodide) as disclosed in the above Patent Literatures 1 to 4 does not have a peak in the above 2θ range.

It is preferable that a ratio $R_P$ of a height of the peak to a height of a peak in the range of 2θ=17.0 to 20.0° [(a height of a peak in a range of 2θ=19.7 to 22.5°)/(a height of a peak in a range of 2θ=17.0 to 20.0°)×100] is in the following range.

0%<$R_P$≤7%

It is more preferable that the ratio $R_P$ is in the following range.

2%<$R_P$≤5%

The present cathode active material having the $R_P$ within the above range is especially excellent in the initial discharge capacity and cycle characteristics.

Peak of dQ/dV Curve of the Present Cathode Active Material

The shape of a charge-discharge curve of the present cathode active material greatly changes between an initial charge and discharge and a second and subsequent charges and discharges when the charges and discharges are repeated under later-described conditions for battery test. It is supposed that the change in the shape of the charge-discharge curve between the initial charge and discharge and the second and subsequent charges and discharges is attributable to a change in the structure of the cathode active material during the initial charge and discharge. The cathode active material of the exemplary embodiment exhibits a specific shape of the initial charge-discharge curve. The shape of the initial charge-discharge curve can be determined using the dQ/dV curve.

The charge-discharge curve is drawn by plotting a data obtained when a battery is charged and discharged under the later-described conditions for the battery test in a graph having an abscissa axis representing a capacity Q and an ordinate axis representing a voltage V. The dQ/dV curve is drawn by plotting the data in a graph having an abscissa axis representing the voltage V and an ordinate axis representing dQ/dV (i.e. a ratio of a variation dQ of the capacity Q to a variation dV of the voltage V).

The present cathode active material has one peak in the following range of voltage $V_1$ and two peaks in the following range of voltage $V_2$ in the initial dQ/dV curve (discharge).

$V_1$=2.72 to 2.90 [V]
$V_2$=4.50 to 4.80 [V]

It is especially preferable that the peaks are present in the following ranges of voltages $V_1$ and $V_2$.

$V_1$=2.72 to 2.80 [V]
$V_2$=4.60 to 4.74 [V]

When the peaks are present in the above ranges, excellent cycle characteristics can be obtained.

In the present cathode active material, it is preferable that a ratio ($I_1/I_2$) of an intensity ($I_1$) of one of the peaks with the highest voltage to an intensity ($I_2$) of the other of the peaks with the lowest voltage in the range of $V_2$ in the initial dQ/dV curve (discharge) is within the following range.

0<($I_1/I_2$)≤1.30

It is more preferable that the ratio ($I_1/I_2$) is in the following range.

0.3≤($I_1/I_2$)≤1.00

When the ratio ($I_1/I_2$) is within in the above range, excellent cycle characteristics can be obtained.

Physical Properties of the Present Cathode Active Material

A specific surface area (SSA) of the present cathode active material measured under measurement conditions of later-described BET specific surface area is preferably within the following range.

SSA=1 to 40 [m$^2$/g]

It is more preferable that the specific surface area is in the following range.

SSA=1 to 30 [m$^2$/g]

It is further preferable that the specific surface area is in the following range.

SSA=4 to 30 [m$^2$/g]

When the specific surface area is larger than 40 m$^2$/g, the cycle characteristics may be disadvantageously lowered. In contrast, when the specific surface area is smaller than 1 m$^2$/g, the initial discharge capacity may be disadvantageously lowered.

Next, a manufacturing method of the present cathode active material (referred to as "the present manufacturing method" hereinafter) according to the exemplary embodiment will be described below.

The Present Manufacturing Method

The present manufacturing method includes the following steps A and B.

A. Material-mixing step (a step in which the materials are mixed to prepare a mixture)

B. Burning step (a step in which the mixture is burnt to prepare the cathode active material of the exemplary embodiment)

Material-Mixing Step

Known compounds containing Li, Mn, and/or Ni are usable as the material in the material-mixing step in the present manufacturing method. The known compounds usable as the material in the material-mixing step may contain the element(s) M.

Examples of a compound containing Li include the compounds below. It should be noted that these compounds may further contain crystallization water. It should also be noted that these compounds may be used in combination at a predetermined ratio.

Compound Containing Li $Li_2CO_3$, LiOH, $LiNO_3$, $CH_3COOLi$, $Li_2SO_4$, $Li_3PO_4$ etc.

It is preferable that the following compounds are used.

More Preferable Compound Containing Li $Li_2CO_3$, LiOH, $LiNO_3$, $CH_3COOLi$

The use of the above compounds is preferable because elements other than Li and O are removed when the above compounds are burnt.

Examples of a compound containing Mn include the compounds below. It should be noted that these compounds may further contain crystallization water. It should also be noted that these compounds may be used in combination at a predetermined ratio.

Compound Containing Mn $MnO_2$, $Mn_2O_3$, $Mn_3O_4$, $MnCO_3$, $Mn(CH_3COO)_2$, $Mn(OH)_2$, $Mn(NO_3)_2$, $MnSO_4$ etc.

It is preferable that the following compounds are used.

More Preferable Compound Containing Mn $MnO_2$, $Mn_3O_4$, $MnCO_3$, $Mn(CH_3COO)_2$, $Mn(NO_3)_2$, $Mn(OH)_2$ The use of the above compounds is preferable because elements other Mn and O are removed when the above compounds are burnt.

Examples of a compound containing Ni include the compounds below. It should be noted that these compounds may further contain crystallization water. It should also be noted that these compounds may be used in combination at a predetermined ratio.

Compound Containing Ni

NiO, $Ni_2O_3$, $NiCO_3$, $Ni(CH_3COO)_2$, $Ni(OH)_2$, $Ni(NO_3)_2$, $NiSO_4$ etc.

It is preferable that the following compounds are used.

More Preferable Compound Containing Ni

NiO, $Ni_2O_3$, $NiCO_3$, $Ni(CH_3COO)_2$, $Ni(OH)_2$, $Ni(NO_3)_2$

The use of the above compounds is preferable because elements other Ni and O are removed when the above compounds are burnt.

As compounds containing the elements M, any known compounds containing M are usable. In the present manufacturing method, it is preferable that compounds from which elements other than M and O are removed after being burnt are used.

In the present manufacturing method, the above materials are mixed to prepare a mixture in the material-mixing step.

The materials may be mixed by dry mixing or wet mixing. In order to mix the materials, the following typically known mixers are usable.

Mixer

Agitation mixer, mixer, ball mill, jet mill, bead mill etc.

A median size (d50) of grain size distribution of the mixture obtained in the material-mixing step, which is measured under the later-described measurement conditions of the grain size distribution, is preferably within the range below. It should be noted that the median size in a case of wet mixing refers to a median size of a slurry after being mixed (referred to as a mixed slurry hereinafter).

d50=0.1 to 0.5 [μm]

When the median size of the mixture is not within the above range, it is likely that the elements Li, Mn, Ni and M may be unevenly dispersed in the mixture. With the use of the mixture in which the elements Li, Mn, Ni and M are unevenly dispersed, unreacted material may remain in the cathode active material obtained after the burning step or unexpected by-product(s) may be generated. Such a cathode active material may cause energy density reduction or adverse affect on the cycle characteristics and thus is not preferable.

In order to achieve the median size of the mixture, the material(s) may be preliminarily pulverized into a predetermined median size and may be subsequently mixed. Further, the materials may be pulverized into the above median size after the materials are mixed. The materials may be pulverized by dry pulverization or wet pulverization. It is preferable in the material-mixing step that wet pulverization is used. The wet pulverization can pulverize the materials more finely than the dry pulverization and thus is suitable for achieving the above median size of the mixture. In order to pulverize the materials by the wet pulverization, the following typically known pulverizers are usable.

Pulverizer

Bead mill, ball mill etc.

When the wet mixing and/or wet pulverization is used in the material-mixing step, the mixed slurry is dried to prepare the mixture. In order to dry the mixed slurry, the following typically known drying methods are usable.

Drying Method

Evaporation drying, vacuum drying, decompression drying, spray drying, freeze drying etc.

Burning Step

In the present manufacturing method, the mixture prepared in the material-mixing step is burnt in a burning step to prepare the cathode active material. In order to burn the mixture, the following typically known burning furnaces are usable.

Burning Furnace

Muffle furnace, roller hearth kiln, atmosphere furnace etc.

In the burning step, it is preferable that the mixture is burnt in the burning temperature range below. It should be noted that the burning temperature (T) refers to a temperature of the atmosphere in the burning furnace or the temperature of the mixture.

T=500 to 900 [degrees C.]

It is more preferable that the burning temperature is in the following range.

T=700 to 850 [degrees C.]

When the burning temperature is lower than 500 degrees C., it is possible that the cathode active material having the spinel structure cannot be obtained. When the burning temperature is higher than 900 degrees C., it is possible that the crystal may be overgrown or different phases may be generated. With the burning temperature ranging from 700 to 850 degrees C., a cathode active material having a high energy density and excellent cycle characteristics can be obtained.

In the burning step, it is preferable that the temperature-increase rate is in the range below. It should be noted that the temperature-increase rate ($R_{up}$) is defined as an average $((T_1-T_0)/(t_1-t_0))$ of time from when the temperature starts increasing (temperature: $T_0$, time: $t_0$) to when a predetermined burning temperature is reached (temperature: $T_1$, time: $t_0$).

$R_{up}$=10 to 500 [degrees C./hr]

It is more preferable that the temperature-increase rate is kept in the following range.

$R_{up}$=50 to 300 [degrees C./hr]

When the temperature-increase rate is smaller than 50 degrees C./hr, the productivity is unfavorably decreased due to the increase in the time required for increasing the temperature. In contrast, when the temperature-increase rate is larger than 300 degrees C./hr, it is likely that the temperature distribution in the mixture becomes uneven and thus the mixture cannot be uniformly burnt, which is not preferable.

In the burning step, it is preferable that the burning temperature is kept in the burning time range below. It should be noted that the burning time (t) is defined as a time from when the predetermined burning temperature is reached to when the temperature becomes 50 or more degrees C. below the predetermined burning temperature.

t=0.1 to 24 [hr]

It is more preferable that the burning time is kept in the following range.

t=0.1 to 10.0 [hr]

When the burning time is shorter than 0.1 hr, it is possible that the cathode active material having the spinel structure cannot be obtained, which is not preferable. When the burning time is longer than 10.0 hr, the productivity is unfavorably decreased.

In the burning step, it is preferable that the temperature-decrease rate is in the range below. It should be noted that the temperature-decrease rate ($R_{down}$) is defined as an average $((T_0-300)/(t_0-t_1))$ of time from when the temperature starts decreasing (temperature: $T_0$, time: $t_0$) to when the temperature reaches 300 degrees C. (temperature: 300 degrees C., time: $t_1$).

$R_{down}$=10 to 500 [degrees C./hr]

It is more preferable that the temperature-decrease rate is kept in the following range.

$R_{down}$=50 to 200 [degrees C./hr]

When the temperature-decrease rate is smaller than 50 degrees C./hr, the productivity is unfavorably decreased. In contrast, when the temperature-decrease rate is larger than 200 degrees C./hr, it is likely that sufficient oxygen for forming the spinel crystal structure is not supplied and oxygen deficiency structure is generated.

A burning atmosphere in the burning step is not specifically limited. The burning step may be performed in the atmosphere, and may be performed in a circulating atmosphere.

Next, a cathode according to the exemplary embodiment will be described below.

Cathode of Exemplary Embodiment

The cathode of the exemplary embodiment contains the cathode active material of the exemplary embodiment. The cathode of the exemplary embodiment may contain, as necessary, components such as an active material other than the present cathode active material (referred to as "other active material" hereinafter), electrical conductive material, binder, and current collector.

Examples of the other active material usable for the cathode of the exemplary embodiment include the conventionally known compounds mentioned below. It should be noted that any compound other than the compounds below can be used for the other active material for the cathode of the exemplary embodiment as long as the compound is capable of storing and discharging Li.

Other Active Material $LiCoO_2$, $LiNiO_2$, $LiNi_{0.33}Mn_{0.33}Co_{0.33}O_2$, $LiMn_2O_4$, $LiMn_{1.5}Ni_{0.5}O_4$ etc.

Examples of the electrical conductive material usable for the cathode of the exemplary embodiment include the conventionally known electrical conductive materials mentioned below. It should be noted that any electrical conductive material other than the electrical conductive materials mentioned below is usable for the cathode of the exemplary embodiment as long as the electrical conductive material is capable of conducting electrons.

Electrical Conductive Material

Active carbon, cokes, carbon black, acetylene black, graphite etc.

Examples of the binders usable for the cathode of the exemplary embodiment include the conventionally known binders mentioned below. It should be noted that any binder other than the binders mentioned below is usable for the cathode of the exemplary embodiment as long as the binder is capable of binding the cathode active material, the electrical conductive material, the current collector and the like.

Binder

PVDF (polyvinylidene fluoride), PTFE (polytetrafluoroethylene), fluororubber etc.

Examples of the current collectors usable for the cathode of the exemplary embodiment include the conventionally known current collectors mentioned below. It should be noted that any current collector other than the current collectors mentioned below is usable for the cathode of the exemplary embodiment as long as the current collector is capable of conducting electrons and is not oxidized or reduced when being charged/discharged.

Current Collector

Metal (e.g. aluminum, titanium and stainless steel) foil, expand metal, punching metal, metal foam, carbon cloth, carbon paper etc.

Next, a non-aqueous electrolyte secondary battery according to the exemplary embodiment will be described below.

Non-Aqueous Electrolyte Secondary Battery of Exemplary Embodiment

The non-aqueous electrolyte secondary battery of the exemplary embodiment includes the cathode of the exemplary embodiment, an anode, an electrolyte and an exterior material. The non-aqueous electrolyte secondary battery of the exemplary embodiment may also include a separator as necessary. Further, the non-aqueous electrolyte secondary battery of the exemplary embodiment may also include a solid electrolyte instead of the electrolytic solution.

The anode of the non-aqueous electrolyte secondary battery of the exemplary embodiment contains an anode active material. The anode of the exemplary embodiment may include a binder, a current collector and the like as necessary.

Examples of the anode active materials usable for the anode of the non-aqueous electrolyte secondary battery of the exemplary embodiment include the conventionally known materials mentioned below. It should be noted that any compound other than the compounds below can be used for the material of the anode of the exemplary embodiment as long as the compound is capable of storing and discharging Li.

Anode Active Material

Soft carbon, hard carbon, graphite powder, mesophase carbon fiber, mesophase microsphere, carbon material, metal Li, Li alloy, Li oxide, Li nitride etc.

Examples of the binders usable for the anode of the non-aqueous electrolyte secondary battery according to the exemplary embodiment include the conventionally known binders mentioned below. It should be noted that any binder other than the binders mentioned below is usable for the anode of the exemplary embodiment as long as the binder is capable of binding the anode active material, the current collector and the like.

Binder

Carboxymethyl cellulose, cross-linked rubber latex of styrene-butadiene, acrylic latex, PVDF etc.

Examples of the current collectors usable for the anode of the non-aqueous electrolyte secondary battery according to the exemplary embodiment include the conventionally known current collectors mentioned below. It should be noted that any current collector other than the current collectors mentioned below is usable for the anode of the exemplary embodiment as long as the current collector is capable of conducting electrons and is not oxidized or reduced when being charged/discharged.

Current Collector

Metal (e.g. copper, nickel and stainless steel) foil, expand metal, punching metal, metal foam, carbon cloth, carbon paper etc.

The electrolytic solution usable for the non-aqueous electrolyte secondary battery of the exemplary embodiment includes a non-aqueous solvent and an electrolyte.

Examples of the non-aqueous solvent usable for the electrolytic solution of the non-aqueous electrolyte secondary battery according to the exemplary embodiment includes the conventionally known non-aqueous solvent mentioned below. It should be noted that any non-aqueous solvent other than the non-aqueous solvents mentioned below is usable for the electrolytic solution of the exemplary embodiment as long as the non-aqueous solvent is capable of conducting Li ions and is not decomposed when being charged/discharged. In addition, these non-aqueous solvents may be mixed in use.

Non-Aqueous Solvent

Ethylene carbonate, propylene carbonate, 1,2-butylene carbonate, 2,3-butylene carbonate, 1,2-pentylene carbonate, 2,3-pentyl ene carbonate, trifluoromethylethylene carbonate, fluoroethylene carbonate, 4,5-difluoroethylene carbonate, γ-butyrolactone, γ-valerolactone, sulfolane, tetrahydrofuran, dioxane, ethylmethyl carbonate, dimethyl carbonate, diethyl carbonate, methylpropyl carbonate, methylisopropyl carbonate, dipropyl carbonate, methylbutyl carbonate, dibutyl carbonate, ethylpropyl carbonate, methyl trifluoroethyl carbonate, acetonitrile, dimethyl ether, methyl propionate, dimethoxyethane etc.

Examples of the electrolyte usable for the electrolytic solution of the non-aqueous electrolyte secondary battery according to the exemplary embodiment include the conventionally known electrolytes mentioned below. It should be noted that any electrolyte other than the electrolytes mentioned below is usable for the electrolytic solution of the non-aqueous electrolyte secondary battery of the exemplary embodiment as long as the electrolyte contains Li and is dissolved in the non-aqueous solvent.

Electrolyte

LiPF$_6$, LiClO$_4$, LiAsF$_6$, Li$_2$SiF$_6$, LiOSO$_2$C$_k$F$_{(2k+1)}$ [k is an integer ranging from 1 to 8], LiN(SO$_2$C$_k$F$_{(2k+1)}$)$_2$ [k is an integer ranging from 1 to 8], LiPF$_n$(C$_k$F$_{(2k+1)}$)$_{6-n}$ [n is an integer ranging from 1 to 5, k is an integer ranging from 1 to 8], LiPF$_4$(C$_2$O$_4$), LiPF$_2$(C$_2$O$_4$)$_2$, LiBF$_4$, LiAlO$_4$, LiAlCl$_4$, Li$_2$B$_{12}$F$_b$H$_{12-b}$ [b is an integer ranging from 0 to 3], LiBF$_q$(C$_s$F$_{(2s+1)}$)$_{4-q}$ [q is an integer ranging from 1 to 3, s is an integer ranging from 1 to 8], LiB(C$_2$O$_4$)$_2$, LiBF$_2$(C$_2$O$_4$), LiB(C$_3$O$_4$H$_2$)$_2$, LiPF$_4$(C$_2$O$_2$) etc.

Examples of the separator usable for the non-aqueous electrolyte secondary battery of the exemplary embodiment include the conventionally known separators mentioned below. It should be noted that any separator other than the separator mentioned below is usable for the non-aqueous electrolyte secondary battery of the exemplary embodiment as long as Li ions can permeate through the separator and the separator can electrically isolate the cathode from the anode.

Separator

A structure (non-woven fabric, paper, porous membrane etc.) including a mixture of an inorganic material (e.g. alumina and silica), and cellulose, aromatic polyamide or a resin such as fluorocarbon resin and polyolefin Examples of the exterior material usable for the non-aqueous electrolyte secondary battery of the exemplary embodiment include the conventionally known exterior materials mentioned below. It should be noted that any exterior material other than the exterior materials mentioned below is usable for the non-aqueous electrolyte secondary battery of the exemplary embodiment as long as the exterior material is not deteriorated even when the cathode, the anode, the electrolytic solution and the like are enclosed.

Exterior Material

Metal such as stainless steel and aluminum, a laminate film (metal film covered with a resin), etc.

Example 1

The invention will be described in detail below with reference to Examples. However, it should be understood that the scope of the invention is by no means limited by the Examples.

Example 1

Material-Mixing Step

Lithium source in a form of LiOH.H$_2$O, nickel source in a form of NiO, and manganese source in a form of MnO$_2$ were prepared. These materials were weighed so that the molar ratio below was reached. The weighed materials were stirred and mixed in an ion-exchange water to prepare a mixed slurry so that the material concentration became 33.3 mass %.

Li:Mn:Ni=2.0:1.5:0.5
Ni/Mn=0.33
Li/Mn=1.33

Wet Pulverization Step

The mixed slurry obtained in the above material-mixing step was pulverized while being stirred using a wet pulverization machine (manufactured by Ashizawa Finetech Ltd.: Stirring Mill LABSTAR LMZ-06). The mixed slurry was pulverized until the median size of the materials in the mixed slurry became 0.35 μm.

The median size of the materials in the mixed slurry was measured using a laser-diffraction/scattering particle-size distribution measurement machine (manufactured by HORIBA, Ltd.: LA-950 particle size distribution analyzer). Specifically, after a small amount of the mixed slurry was collected and sodium hexametaphosphate was added thereto, sonication was applied. Subsequently, after the sonicated mixed slurry was dropped on the laser-diffraction/scattering particle-size distribution measurement machine so that transmissivity was adjusted to be in a range from 40 to 60%, the particle-size distribution was measured.

Spray Drying Step

The mixed slurry obtained in the above wet pulverization step was spray-dried using a nozzle spray drier (manufactured by Ohkawara Kakohki Co., Ltd.: L-8 spray drier). Air was used for the drying gas of the nozzle spray drier. After regulating the flow rate of the drying gas so that a cyclone differential pressure became 0.7 kPa, the temperature of the drying gas was set at 200 degrees C. After the temperature of the drying gas reached 200 degrees C., the mixed slurry was introduced at a rate of 2.5 kg/h. The nozzle spray pressure at this time was 1.5 MPa.

Burning Step

The mixture obtained in the above spray drying step was burnt under the following burning conditions to prepare a cathode active material.

Burning furnace: muffle furnace
Atmosphere: air
Loaded amount: 30 g
Burning temperature: 600 degrees C.
Temperature-increase rate: 150 [degrees C./hr]
Burning time: 6 hrs
Temperature-decrease rate: 100 [degrees C./hr]

Powder X-Ray Diffraction Measurement

The cathode active material obtained in the above burning step was subjected to a powder X-ray diffraction measurement under the following conditions.

X-ray diffraction machine: SmartLab (manufactured by Rigaku Corporation)
X-ray source: Cu-Kα ray
Acceleration voltage, current: 45 KV, 200 mA
Light-receiving slit: 13 mm
Scanning speed: 5.1 degrees/min
Step width: 0.02°
Measurement range (2θ): 5 to 90°

An X-ray diffraction pattern obtained by subjecting the cathode active material to the powder X-ray diffraction measurement is shown in FIG. 1. The X-ray diffraction pattern shown in FIG. 1 has peaks in the ranges of 2θ=17.0 to 20.0°, 35.0 to 37.5°, 37.5 to 39.0°, 2θ=41.5 to 46.0°, and 2θ=47.7 to 50.0°. Accordingly, the cathode active material is supposed to have a spinel structure. Further, the cathode active material has a peak other than spinel in a range 2θ=19.7 to 22.5°. It should be noted that the presence of the peaks is judged based on a peak data detected by reading measurement data into an integrated powder X-ray analysis software PDXL (produced by Rigaku Corporation) to automatically perform data processing such as peak detection and background-noise removal under default conditions. Further, a height of the peak in the range of 2θ=17.0 to 20.0° and a height of the peak in the range of 2θ=19.7 to 22.5° were obtained based on the peak data and a ratio R$_p$ [(the height of the peak in the range of 2θ=19.7 to 22.5°)/(the height of the peak in the range of 2θ=17.0 to 20.0°)×100] was calculated.

BET Specific Surface Area Measurement

The cathode active material obtained in the above burning step was subjected to a BET specific surface area measurement under the following conditions.

BET specific surface area measurement machine: Macsorb HM model-1220 (manufactured by Mountech CO., Ltd.)

Sample amount: 1 g

Pre-treatment: 300 degrees C.—1 hr

Measurement results are shown in Table 1.

A half cell including a non-aqueous electrolyte secondary battery having a lithium electrode (i.e. an anode) opposite to the cathode was prepared to evaluate the electrochemical properties of the present cathode active material (initial discharge capacity, cycle characteristics, dQ/dV curve).

Preparation of Half Cell

The cathode active material obtained in the above burning step, an electrical conductive material in a form of acetylene black and KS6 and a binder in a form of polyvinylidene fluoride were respectively weighed to be a mass ratio of 80:5:5:10. The above cathode active material, the electrical conductive material and the binder were mixed in N-methyl-2-pyrrolidone (NMP) to prepare a cathode coating liquid. The cathode coating liquid was applied on the current collector in a form of aluminum foil. After being dried, the current collector was rolled to have a film thickness in a range from 35 to 45 The actual film thickness was 40 Subsequently, the current collector was punched in a diameter of 14 mm, and was vacuum-dried to obtain a cathode.

The above cathode and the anode (metal lithium foil: thickness 0.2 mm) were layered in a coin-type cell case through a separator (glass filter). Subsequently, an electrolytic solution in which $LiPF_6$ was dissolved at 1 mol/L concentration in a mixture solvent of ethylene carbonate and ethylmethyl carbonate (volume ratio 1:2) was poured in the coin-type cell case to produce the half cell.

Evaluation of Battery

The half cell produced according to the above method was evaluated in terms of the initial discharge capacity, cycle characteristics and dQ/dV curve according to the methods below.

Initial Discharge Capacity

Electric current corresponding to 0.05 C was charged to the opposite electrode (lithium electrode) to 4.8 V. Subsequently, an electric current corresponding to 0.2 C was discharged from the battery to 2.0 V. The discharge capacity at this time was defined as an initial discharge capacity. The results are shown in Table 2. The discharge capacity at this time is converted to a capacity per mass of the cathode active material. It should be noted that the electric current corresponding to 0.05 C refers to a current density capable of completely discharging a battery in 20 hours.

Cycle Characteristics

Herein, the cycle characteristics are evaluated in terms of the discharge capacity after 50 cycles of charging and discharging. Similar to the measurement of the discharge capacity, electric current corresponding to 0.05 C was charged to 4.8 V. Subsequently, an electric current corresponding to 0.2 C was discharged from the battery to 2.0 V. In the second and subsequent cycles, an electric current corresponding to 0.2 C was repeatedly applied to/discharged from the battery in a range from 2.0 to 4.8 V, and the discharge capacity after 50 cycles was measured. It should be noted that the electric current corresponding to 0.2 C refers to a current density capable of completely discharging a battery in 5 hours.

dQ/dV Curve

Figure 2:
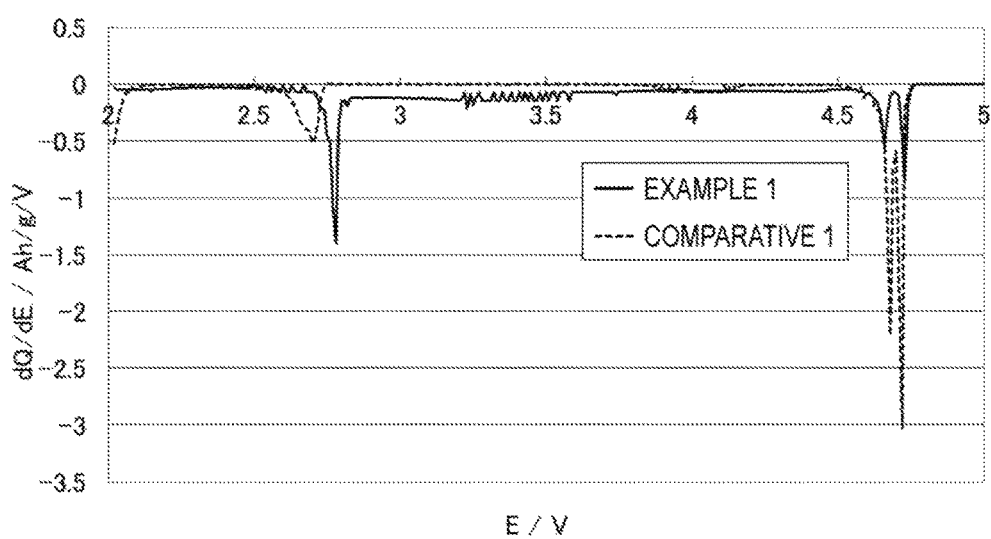
FIG. 2 is a graph showing an initial dQ/dV curve of cycle characteristics (abscissa axis: voltage (lithium based), ordinate axis: rate of a variation dQ of a discharge capacity Q to a variation dV of a voltage V) of the cathode active material obtained in each of Example 1 and Comparative 1.

The dQ/dV curve is a curve defined in a graph having an abscissa axis representing the voltage (based on lithium) and an ordinate axis representing a ratio of a variation dQ of the discharge capacity Q to a variation dV of the voltage V. Initial dQ/dV curve is shown in FIG. 2. It should be noted that the dQ/dV curve of the cathode active material was drawn by picking up the discharge capacities Q at 0.1 V intervals from the initial discharge curve data of the above cycle characteristics and plotting the variation dV of the voltage V and the variation dQ of the discharge capacity Q. Further, the presence and intensity of the peak are shown in Table 1. At this time, a ratio ($I_1/I_2$) of an intensity ($I_1$) of one of the peaks with the highest voltage to an intensity ($I_2$) of the other of the peaks with the lowest voltage in the range of $V_2$ was 0.39.

Example 2

The cathode active material was obtained in the same manner as in Example 1 except that the burning temperature was 700 degrees C. The obtained cathode active material was measured and evaluated in the same manner as in Example 1. The results are shown in Tables 1 and 2. At this time, the ratio ($I_1/I_2$) of the intensity ($I_1$) of one of the peaks with the highest voltage to the intensity ($I_2$) of the other of the peaks with the lowest voltage in the range of $V_2$ was 1.0.

Example 3

The cathode active material was obtained in the same manner as in Example 1 except that the burning temperature was 900 degrees C. The obtained cathode active material was measured and evaluated in the same manner as in Example 1. The results are shown in Tables 1 and 2. At this time, the ratio ($I_1/I_2$) of the intensity ($I_1$) of one of the peaks with the highest voltage to the intensity ($I_2$) of the other of the peaks with the lowest voltage in the range of $V_2$ was 0.65.

Comparative 1

The cathode active material was obtained in the same manner as in Example 3 except that the ratio of the materials of the cathode active material was defined as below (molar ratio). The obtained cathode active material was measured and evaluated in the same manner as in Example 1. The results are shown in FIG. 1 and Tables 1 and 2. At this time, the ratio ($I_1/I_2$) of the intensity ($I_1$) of one of the peaks with the highest voltage to the intensity ($I_2$) of the other of the peaks with the lowest voltage in the range of $V_2$ was 1.37.

Li:Mn:Ni=1.0:1.5:0.5

Ni/Mn=0.33

Li/Mn=0.67

Comparative 2

The cathode active material was obtained in the same manner as in Example 1 except that the ratio of the materials of the cathode active material was defined as below (molar ratio) and the burning temperature was 700 degrees C. The obtained cathode active material was measured and evaluated in the same manner as in Example 1. The results are shown in Tables 1 and 2.

Li:Mn:Ni=2.8:1.5:0.5

Ni/Mn=0.33 Li/Mn=1.87

Comparative 3

Using the cathode active material obtained in the same manner as Comparative 1, a non-aqueous electrolyte secondary battery was produced according to the production method of the above-described non-aqueous electrolyte secondary battery and Li was electrochemically inserted. Specifically, electric current corresponding to 0.05 C was discharged from the non-aqueous electrolyte secondary battery to 2.5 V. Subsequently, the non-aqueous electrolyte secondary battery was disassembled to take out the cathode. Then, after being washed, the cathode was burnt at 480 degrees C. to obtain a cathode active material.

The obtained cathode active material was measured and evaluated in the same manner as in Example 1. At this time, the ratio ($I_1/I_2$) of the intensity ($I_1$) of one of the peaks with the highest voltage to the intensity ($I_2$) of the other of the peaks with the lowest voltage in the range of $V_2$ was 1.89.

Li:Mn:Ni=1.2:1.5:0.5
Ni/Mn=0.33
Li/Mn=0.8

Figure 3:
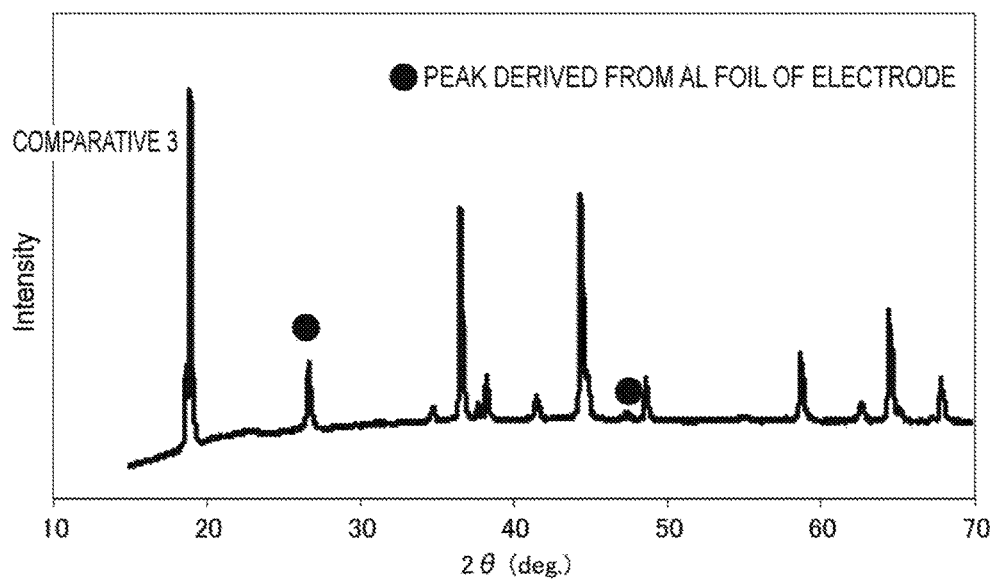
FIG. 3 is a graph showing an X-ray diffraction pattern of a cathode active material obtained in Comparative 3 prepared according to a method similar to a method disclosed in Patent Literature 4.

It should be noted that the cathode taken out and washed was directly set to the X-ray diffraction machine only during the X-ray diffraction measurement to be measured in a range of 2θ=15 to 70°. The results are shown in Tables 1 and 2. Further, the X-ray diffraction pattern is shown in FIG. 3. It should be noted that the cathode having been subjected to the X-ray diffraction measurement include the Al foil of the electrode. Accordingly, the X-ray diffraction pattern shown in FIG. 3 includes diffraction peaks derived from the Al foil of the electrode as represented by black circles in FIG. 3.

Comparative 4

A cathode active material A having a layered structure was obtained in the same manner as in Example 3 except that the ratio of the materials of the cathode active material was defined as below (molar ratio). The obtained cathode active material A was mixed with a cathode active material B having the spinel structure obtained in Comparative 1 at a weight ratio of A:B=6:4 to obtain a mixture C. The obtained mixture C was measured and evaluated in the same manner as in Example 1. The results are shown in Tables 1 and 2. At this time, the ratio ($I_1/I_2$) of the intensity ($I_1$) of one of the peaks with the highest voltage to the intensity ($I_2$) of the other of the peaks with the lowest voltage in the range of $V_2$ was 1.38.

Cathode Active Material A Having Layered Structure
Li:Mn:Ni=3:1.5:0.5
Ni/Mn=0.33
Li/Mn=0.8
Cathode Active Material B Having Spinel Structure
Li:Mn:Ni=1.0:1.5:0.5
Ni/Mn=0.33
Li/Mn=0.67
Mixture C
Li:Mn:Ni=2.2:1.5:0.5
Ni/Mn=0.33
Li/Mn=1.47

TABLE 2

|  | Initial Discharge Capacity [mAh/g] | Discharge Capacity after 50 Cycles [mAh/g] |
|---|---|---|
| Ex. 1 | 290 | 188 |
| Ex. 2 | 278 | 200 |
| Ex. 3 | 110 | 220 |
| Comp. 1 | 191 | 111 |
| Comp. 2 | 250 | 172 |
| Comp. 3 | 188 | 105 |
| Comp. 4 | 241 | 175 |

The invention claimed is:

1. A cathode active material for a non-aqueous electrolyte secondary battery, wherein the cathode active material satisfies conditions (1) to (5) below:
   (1) the cathode active material comprises Li, Mn, and Ni and has a spinel structure;
   (2) a molar ratio (Ni/Mn) of Ni to Mn is in a range from 0.10 to 0.43;
   (3) a molar ratio (Li/Mn) of Li to Mn is in a range from 0.70 to 1.80;
   (4) the cathode active material has a peak in a range of 2θ=19.7 to 22.5° in an X-ray diffraction pattern; and
   (5) the cathode active material has at least one peak in a first voltage range of voltage $V_1$ and at least two peaks in a second voltage range of voltage $V_2$ in an initial dQ/dV curve of a discharge measured in a half cell prepared using the cathode active material according to a process below,
   $V_1$=2.72 to 2.90 [V]
   $V_2$=4.50 to 4.80 [V]
   wherein the process comprises:
      weighing the cathode active material, an electrical conductive material in a form of acetylene black and KS6 and a binder in a form of polyvinylidene fluoride to be a mass ratio of 80:5:5:10;
      mixing the cathode active material, the electrical conductive material and the binder in N-methyl-2-pyrrolidone (NMP) to prepare a cathode coating liquid;
      applying the cathode coating liquid on a current collector in a form of an aluminum foil and, after drying the cathode coating liquid, rolling the current collector so that the current collector has a film thickness in a range from 35 to 45 μm;

TABLE 1

|  | Composition | | | | | Burning Temperature [Degrees C.] | X-ray Diffraction | | Specific Surface Area $R_p$ [m²/g] | dQ/dV Curve | |
|---|---|---|---|---|---|---|---|---|---|---|---|
|  | Li | Mn | Ni | Ni/Mn | Li/Mn |  | Spinel Structure | Peak in 2θ = 19.7 to 22.5° |  | Peak of $V_1$ (Voltage, Intensity) | Peak of $V_2$ (Voltage, Intensity) |
| Ex. 1 | 2.0 | 1.5 | 0.5 | 0.33 | 1.33 | 600 | Yes | Yes | 5% | 25.1 | Peak 1 (2.78, −1.3997) | Peak 1 (4.66, −0.5648) Peak 2 (4.73, −0.2201) |
| Ex. 2 | 2.0 | 1.5 | 0.5 | 0.33 | 1.33 | 700 | Yes | Yes | 5% | 15.4 | Peak 1 (2.75, −1.3965) | Peak 1 (4.70, −1.1021) Peak 2 (4.72, −1.1021) |
| Ex. 3 | 2.0 | 1.5 | 0.5 | 0.33 | 1.33 | 900 | Yes | Yes | 7% | 1.3 | Peak 1 (2.72, −0.3045) | Peak 1 (4.67, −1.2581) Peak 2 (4.71, −0.8123) |
| Comp. 1 | 1.0 | 1.5 | 0.5 | 0.33 | 0.67 | 900 | Yes | No | — | 0.8 | Peak 1 (2.70, −0.5197) | Peak 1 (4.68, −2.2145) Peak 2 (4.72, −3.0264) |
| Comp. 2 | 2.8 | 1.5 | 0.5 | 0.33 | 1.87 | 700 | No | Yes | 8% | 14.5 | None | None |
| Comp. 3 | 1.2 | 1.5 | 0.5 | 0.33 | 0.80 | 900 | Yes | No | — | 0.8 | Peak 1 (2.67, −1.5250) | Peak 1 (4.69, −2.1534) Peak 2 (4.73, −4.0722) |
| Comp. 4 | 2.2 | 1.5 | 0.5 | 0.33 | 1.47 | 900 | Yes | Yes | 8% | 2.7 | Peak 1 (2.70, −0.2604) | Peak 1 (4.67, −0.5361) Peak 2 (4.71, −0.7373) | punching the current collector in a diameter of 14 mm, and vacuum-drying the current collector to obtain a cathode;

layering the cathode and an anode in a form of a metal lithium foil having a thickness of 0.2 mm in a coin-type cell case through a separator in a form of a glass filter;

pouring an electrolytic solution in which $LiPF_6$ was dissolved at 1 mol/L concentration in a mixture solvent of ethylene carbonate and ethylmethyl carbonate (volume ratio 1:2) in the coin-type cell case to produce the half cell;

charging the half cell with an electric current corresponding to 0.05 C to 4.8 V and discharging the half cell with an electric current corresponding to 0.2 C to 2.0 V; and drawing a dQ/dV curve by picking up discharge capacities Q at 0.1 V intervals from an initial discharge curve data obtained in the charging and discharging and plotting a variation dV of a voltage V and a variation dQ of a discharge capacity Q.

2. The cathode active material for the non-aqueous electrolyte secondary battery according to claim 1, wherein the ratio $(I_1/I_2)$ of the intensity $(I_1)$ of one of the peaks with the highest voltage to the intensity $(I_2)$ of the other of the peaks with the lowest voltage in the range of $V_2$ is in a range of $0<(I_1/I_2)\leq 1.30$.

3. A cathode comprising the cathode active material for the non-aqueous electrolyte secondary battery according to claim 1.

4. A non-aqueous electrolyte secondary battery comprising the cathode according to claim 3.

* * * * *